3 Sheets—Sheet 1.
W. SCOTT.
PRINTING PRESS.
No. 11,166. Reissued May 12, 1891.
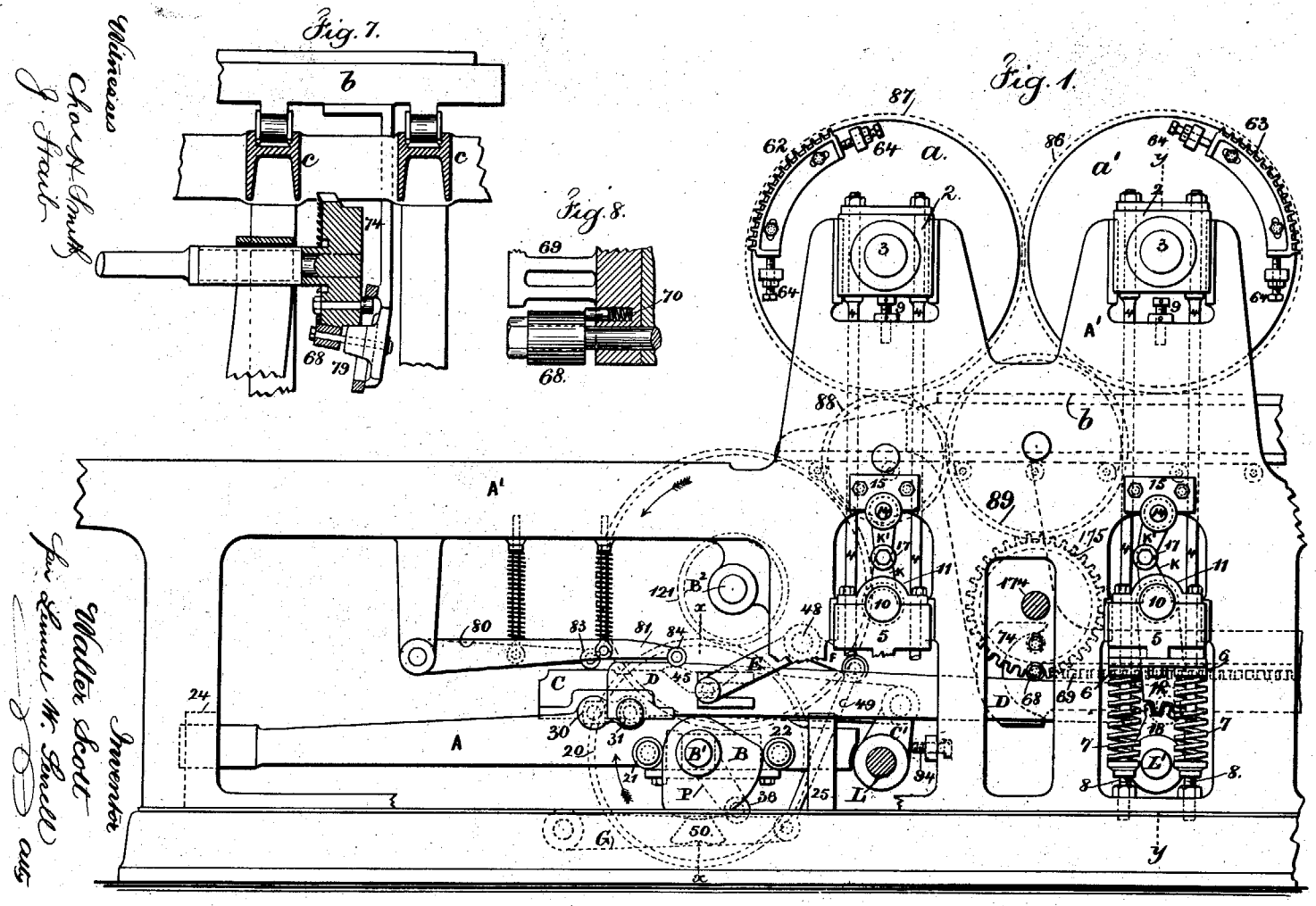

3 Sheets—Sheet 2.

W. SCOTT.

PRINTING PRESS.

No. 11,166. Reissued May 12, 1891.

Witnesses
Chas. H. Smith
J. Stait

Inventor
Walter Scott.
for Lemuel W. Serrell
Atty

3 Sheets—Sheet 3.

W. SCOTT.

PRINTING PRESS.

No. 11,166. Reissued May 12, 1891.

Witnesses

Chas. H. Smith

J. Stail

Inventor

Walter Scott.

per Lemuel W. Serrell

Atty

UNITED STATES PATENT OFFICE.

WALTER SCOTT, OF PLAINFIELD, NEW JERSEY.

PRINTING-PRESS.

SPECIFICATION forming part of Reissued Letters Patent No. 11,166, dated May 12, 1891.

Original No. 425,710, dated April 15, 1890. Application for reissue filed December 2, 1890. Serial No. 373,384.

*To all whom it may concern:*

Be it known that I, WALTER SCOTT, a citizen of the United States, residing at Plainfield, in the county of Union and State of New Jersey, have invented an Improvement in Printing-Presses, of which the following is a specification.

Printing-presses have heretofore been constructed in which the impression-cylinder is raised or lowered, and such impression-cylinder is usually made use of with a reciprocating flat bed; but in some instances the impression-cylinder is used with a revolving type-cylinder, and sometimes there are two impression-cylinders in the same press that require to be raised and lowered at the proper times for giving the impressions. In some of these presses the impression-cylinder is turned first one way and then the other. In others it is revolved continuously, and in others rotated and then stopped and raised as the bed returns.

My present invention relates to the mechanism for moving the impression-cylinder up and down bodily for giving and throwing off the impression, whereby the operation is rendered more perfect and reliable, and the mechanism is cheaper to construct and more durable than in the presses of this character heretofore made.

My improved mechanism may be used with a single impression-cylinder. I have, however, represented it as adapted to two impression-cylinders.

Figure 4:
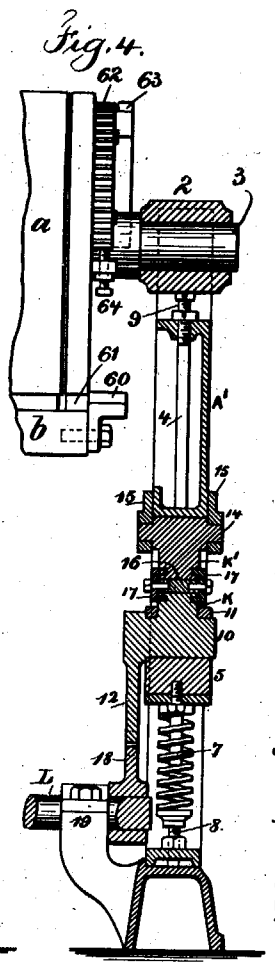
Figure 5:
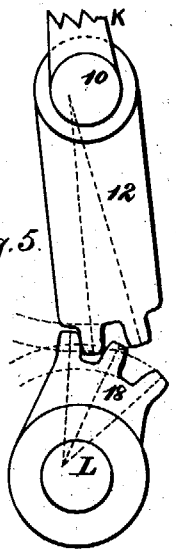
Figure 9:
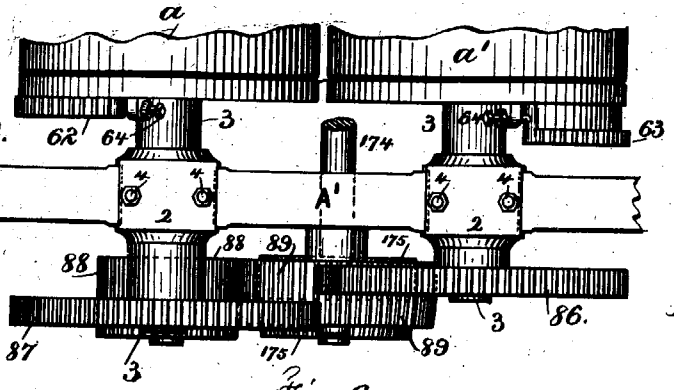
Figure 6:
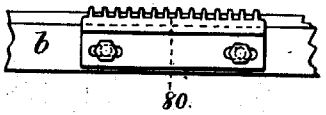
Figure 2:
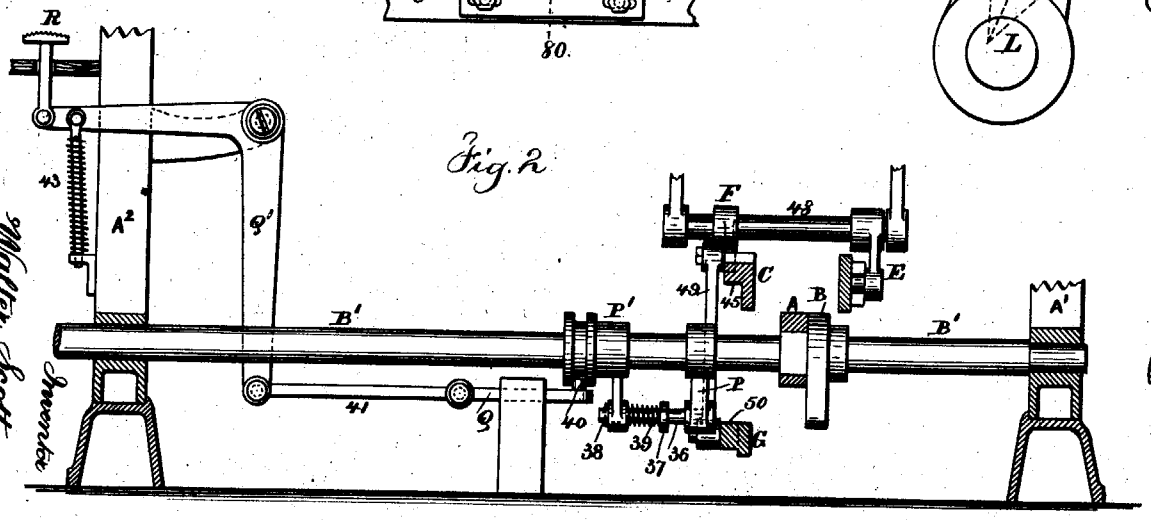
Figure 3:
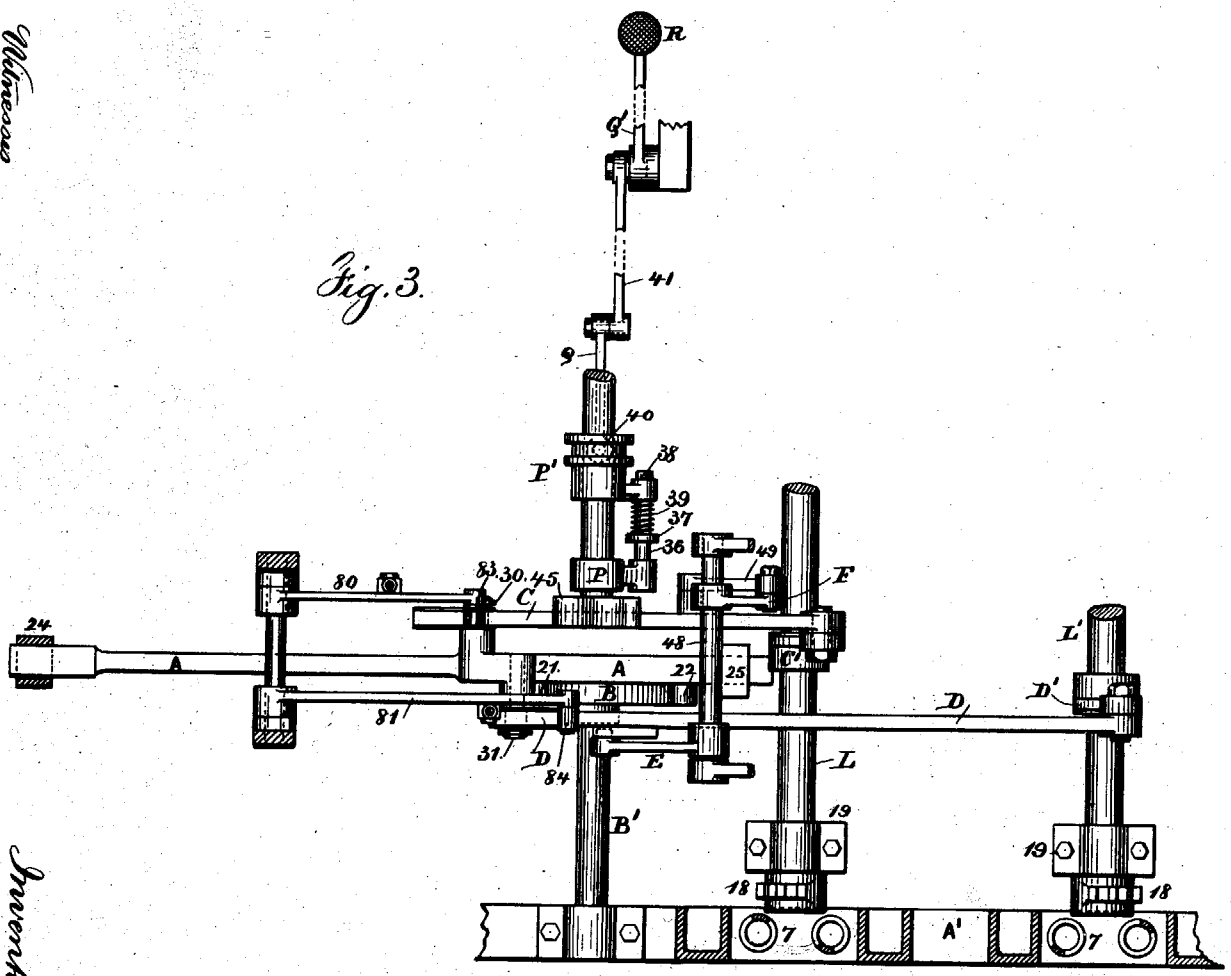

In the drawings, Figure 1 is an elevation representing two impression-cylinders with the mechanism connected therewith, the frame-work and portions of the devices connected with one of the impression-cylinders being removed to show the parts that come between the frames of the press. Fig. 2 is a cross-section at the line *x x*, Fig. 1. Fig. 3 is a digrammatic plan of the devices that come between the frames of the press and actuate such impression-cylinders. Fig. 4 is a section at the line *y y* of Fig. 1. Fig. 5 is an elevation of the rack-arms for actuating the toggle-links. Fig. 6 is an elevation of a portion of the type-bed, showing the rack thereon. Fig. 7 is a sectional elevation representing a portion of the type-bed, the rack suspended therefrom, and the driving-pinion for actuating the same, and Fig. 8 is a sectional plan view representing one end of the rack and its roller, and Fig. 9 is a plan illustrative of the position of the gearing shown in Fig. 1.

The impression-cylinders are represented at *a a'* and the type-bed at *b*, and this is supported upon rollers, as usual, upon the cross and longitudinal bearers *c*, and the vertical side frames are represented at A' $A^2$. These side frames are made for the reception of the parts hereinafter described, and there are open jaws within which the boxes 2 for the journals 3 of the impression-cylinders slide, and there are vertical tie-rods 4, passing down, preferably, through the hollow portion of the frame from the boxes 2 to the slides 5, the parts being fitted, so that such slides 5 and boxes 2 can receive the necessary vertical movement in raising or lowering the impression-cylinders, and upon the vertical tie-rods 4 there are adjusting-nuts 6, and the springs 7, resting upon the heads of the adjusting-screws 8, serve to counterbalance the weight of the respective impression-cylinders, or nearly so, in order that the movements of such impression-cylinders bodily and vertically may be easily effected, and the adjustable stop-screws 9 in the side frames A' $A^2$ and beneath the boxes 2 are provided for limiting the downward movements of such boxes and of the impression-cylinders.

Each of the boxes 5 is provided with a toggle, the lower link K of which is made with a cylindrical journal 10, received into a semicylindrical recess in the top of the box 5 and held thereto by the straps 11; and there is an arm 12, extending downwardly from the inner end of the cylinder 10, for the purposes hereinafter named. The upper link K' of each toggle is provided with a journal 14, received into a corresponding recess in the side frame of the press and held thereto by the pivot-plates 15, and between the ends of the toggle-links K K' the pin 16 is received into nearly semicircular recesses, and the washers 17 of the pin have annular and inwardly-projecting rims that pass into segmental slots in the sides of the upper and lower toggle-bars, and these washers are held by bolts or nuts at the ends of the pins 16, so that these pins 16 receive the pressure as the toggles are straightened and the impression-cylinders brought down, and upon the reverse movement as the toggles are bent the rims of the washers connect the ends of the toggles, so that they do not separate, and they will raise the impression-cylinders by the rocking or oscillating movements given to the journals 10 of the toggles by the arms 12, even in cases where the springs 7 may not be sufficiently strong to raise the impression-cylinders, or in cases where such springs become broken.

Below the impression-cylinders there are cross-shafts L L′, having at each outer end a segmental rack 18, the end of which is made with teeth gearing into similar teeth at the lower end of the arm 12. Hence it will be apparent that when the cross-shaft L or L′ below either impression-cylinder is rocked or partially turned in its bearings 19 upon the base of the main frame of the machine, the segmental racks 18 give motion to the arms 12 and either raise or lower the impression-cylinders, and these parts are very strong and reliable and are adapted to give motion to the impression-cylinder regardless of whether there are one or two such impression-cylinders. The rack-teeth upon the arms 12 and racks 18 cannot be arcs struck from the respective axes of motion; but the teeth that come together when the toggles are straight are the nearest to the respective axes, because the journal 10 of the toggle is nearer to the shaft L or L′ when the toggle is straight. The diagram, Fig. 5, represents the construction of these racks 12 and 18.

The mechanisms made use of for rocking the shafts L L′ of the impression-cylinders are next described.

The shaft B′ receives a continuous rotation by any suitable means, such as the gear-wheel 20 to the gear-wheel 121 on the main driving-shaft $B^2$, the gearing being illustrated by dotted lines in Fig. 1, and where the impression-cylinder makes two revolutions for each impression the shaft B′ is to be revolved once for each two revolutions of the impression-cylinder, and where the two impression-cylinders *a a′* are made use of, as illustrated in the drawings, it is usual to print from one of the impression-cylinders while the type-bed *b* and form are moved in one direction, and to print from the other impression-cylinder when the type-bed and form are moving in the other direction. For that reason it is necessary to raise the impression-cylinder *a′* at the time the impression-cylinder *a* is drawn down, and the reverse. Hence I have represented the toggle as standing in the reverse directions, so that as the shafts L L′ are rocked by the mechanism next described one impression-cylinder will be raised as the other is lowered.

Upon the shaft B′ is a cam B, having two segmental surfaces and acting between the rolls 21 22 upon the reciprocating bar A, so as to move and hold such bar first in one direction and then in the other. This bar A is preferably slotted, so that a box around the shaft B′ will be within such slot and the bar A will be partially supported thereby, and there are also stationary guide-boxes 24 25 upon the base of the main frames of the machine for the ends of this reciprocating bar A. Upon this reciprocating bar A are pins 30 31, projecting at opposite sides, and there are latch-bars C and D, notched to drop over these pins. The latch-bar C is pivoted to a crank C′ upon the cross-shaft L, and the latch-bar D is pivoted to a crank D′ upon the cross-shaft L′, and it will now be apparent that when the parts are in operation the cam B gives motion to the reciprocating bar A and latch-bars C D, first in one direction and then in the other direction, and rock and cross shafts L L′, and through the segmental arms and toggles raise and lower the impression-cylinders *a a′* alternately and apply the necessary force to give the impressions when the cylinders are lowered; but it often becomes necessary to throw off the impressions, and sometimes this has to be done with great promptness by the attendant; but it would often be detrimental to stop the press or to throw off the impression, except at the end of the movement of the reciprocating bed in one direction or the other. To accomplish this object I provide the means next described, that are brought into action at the proper moment for raising the latch-bars C and D and throwing off the impression at either end of the movement of the reciprocating bed.

Upon the shaft B′ is a crank-arm P, having through it a sliding crank-pin 36, with two collars 37 and 38 upon it, and a spring 39, and there is a slide-collar P′ around the shaft B′, and having an eye at the end of an arm that projects from the slide-collar, and through this eye the crank-pin 36 passes, and there is a shifting-pin 40 in the peripheral groove of the slide-collar P′, and a slider Q, passing through a box upon the bed-frame, and to this slider Q a link 41 is pivoted and connects the slider to the bent lever Q′, upon the opposite end of which is a treadle R in a position convenient for the attendant to place his foot upon the same whenever the impression is to be thrown off, and the spring 43 restores the parts to their normal position when the foot is removed from the treadle, and there is upon the lever C double inclined cam-ribs 45, and there is a lever G, with similar cams 50, immediately below the lever C and cams 45, and from the end of this lever G a link 49 extends up to the crank-arm F upon the rock-shaft 48, upon which rock-shaft there is a lever-arm E, with a pin at its end passing in between the two ribs on the latch-bar D. It is now to be understood that the crank-pin 36 when projected comes into contact with either the cam 45 on the latch-bar C and lifts the same, so as to raise the latch-bar above its pin 30, and thereby stop the movement of the latch-bar C and the crank C′ and cross-shaft L, or else this crank-pin 36 comes into contact with the cam 50 on the lever G, and by the link 49, arm F, and lever-arm E lifts the latch-bar D from its pin 31, and thereby stops the movement of such latch-bar D and crank D′, and rock-shaft L′, and parts connected therewith to throw off the impression from the cylinder *a*; but when the treadle and crank-pin 36 are in their normal position such crank-pin is drawn into the crank P, as seen in Figs. 2 and 3, and hence it does not come in contact with either the cam 45 or the cam 50; but when the attendant puts his foot upon the treadle R the slide-collar P′ and its arms are moved; but if the crank-pin 36 is adjacent to either cam 45 or 50 the spring 39 is compressed, and it projects the crank-pin 36 as soon as the said crank-pin clears either the cam 45 or 50, to which it may be adjacent, and if the foot remains on the treadle first one latch-bar will be raised and throw off the impression from one cylinder and then the other latch-bar will be raised and throw off the impression from the other cylinder, and the impression-cylinders will remain in an elevated position until the foot is withdrawn from the treadle and the parts return automatically to their normal position.

I provide levers 80 and 81 with rollers 83 84 resting upon the respective latch-bars C and D, and springs to press such rollers upon the latch-bars, and there are notches or inclines upon the upper surfaces of the latch-bars at the places where the rollers rest when the impression-cylinders are raised. Hence there is no risk of the latch-bars being moved endwise accidentally while such latch-bars are raised to throw off the impressions, and the rollers pressing against the inclines tend to force the respective crank-arms or rack-arms against stops, one of which is shown at 94.

In presses of this description where there are two impression-cylinders difficulty is sometimes experienced in properly placing the racks upon the impression-cylinders so as to gear into the rack upon the bed, because the rack upon the bed separates from the teeth on the cylinder when going in one direction and does not come into contact with such gear until the return movement of the bed takes place, and in consequence of the racks upon the impression-cylinders projecting slightly, so that the pitch-line of the rack corresponds with the surface of the cylinder, the rack on one cylinder might come in contact with the rack upon the other cylinder if such racks were applied in the ordinary manner. To obviate these difficulties I make use of a rack projecting from the surface of the bed and adjustable segmental racks upon the respective cylinders, the segmental rack upon one cylinder being in a different plane from the segmental rack upon the other cylinder, in order that the two racks may pass each other freely, and the straight rack upon the reciprocating bed is wide enough for its teeth to engage with both of the segmental racks upon the impression-cylinders. Upon the type-bed *b* the rack 60 projects, and it is bolted firmly to the edge of such type-bed *b*, and it is adjacent to the contiguous ends of the two forms lying upon such bed *b*, and near the longitudinal side bar 61, upon which the end portion of the impression-cylinders bear as they revolve, and it is to be borne in mind that the object of the segmental racks 62 63 is the same as in presses of this general character—namely, to insure accuracy in the relative positions of the type-bed *b* and the impression-cylinders *a a′* at the commencement of each impression, so that the sheet held by the gripper-fingers upon the impression-cylinder may be brought properly to register with the end of the type-form, and the surface of the impression-cylinder will be moving in harmony with the type at the commencement of the impression, and after the rack-teeth separate the end of the impression-cylinder traveling upon the bearer 61 insures uniformity in the impression as the parts are moved together.

The segmental racks 62 and 63 are slotted and attached by bolts to the respective impression-cylinders, and there are end adjusting-screws 64 for holding the racks firmly in the position to which they may be moved, and the respective racks are adjusted with reference to the ends of the forms lying upon the bed *b* in order that each impression may be made with a proper register. If the segmental racks 62 and 63 were in the same plane, the teeth of these racks might come in contact one with the other in passing each other at the place where the cylinders *a a′* are the nearest together, and the teeth of such segmental racks thereby be blocked or injured. To avoid this difficulty the teeth upon these segmental racks 62 63 are only half the length of the teeth upon the rack 60, and the teeth upon the rack 62 are close up to the end of the impression-cylinder *a*, and the teeth upon the rack 63 are sufficiently distant from the end of the impression-cylinder *a′* to be in a different plane from the teeth upon the rack 62. Hence these teeth pass clear of each other under all circumstances, but they are efficient in bringing the respective parts to a perfect register in commencing the respective impressions and avoiding any looseness or blurring action of the sheet against the end portions of the form. In cases where the racks 62 and 63 are bolted firmly to the respective cylinders the rack 60 may be in two parts separated longitudinally on the line 80 and provided with slots, so that they may be separately adjusted lengthwise of the bed.

In presses of this character the type-bed is reciprocated by an endless rack motion. In my patent, No. 321,539, granted July 7, 1885, a driving-wheel and rack and the movements of the respective parts are set forth. At each end of the rack there is a roller 68, that passes into a notch upon the flange of the driving-pinion 74, and this driving-pinion describes a half-circle in turning each end of the rack, and at this time there is a pause in the movement of the reciprocating bed, the same stopping gradually and then starting again in the opposite direction. These features are well known; but I have discovered a difficulty, because when the notch in the flange of the rack-pinion has received the roller 68 and the pinion is describing a half-circle the flange tends to move the roller 68 endwise upon its arbor in consequence of the difference in the angle of the shaft of the pinion as the parts move from above the rack below the rack, and vice versa. This movement of the notched portion of the flange against the roller 68 not only tends to wear both of the parts, but it also applies a considerable strain upon the rack and upon the bed, tending to throw the same out of position laterally. I avoid this difficulty by making the arbor of the roller 68 sufficiently long for a space to exist between the back end of the roll and the portion of the rack 69 to which the arbor of the roller is affixed, and I apply a helical spring 70 and a pin in a hole with the end against the roller 68 to give end motion to such roll and force the same outwardly and away from the base 79 of the rack. Hence as the parts move in the manner before described and the roller 68 is received into the notch in the flange of the pinion the roll 68 is moved bodily and endwise upon its axis or gudgeon, compressing the spring 70 as the parts pass around the end of the rack, and this spring and pin throw the roller 68 back into its normal position and the pinions pass above or below the rack and commence to give end motion to the same.

It is preferable to have the gear-wheel 86 on the shaft of the impression-cylinder *a'* nearer to the frame of the machine than the gear-wheel 87 on the shaft of the impression-cylinder *a*, in order that the teeth of these two wheels may not touch each other, and the gear-wheel 88 is of double width, so as to gear with the intermediate 89 and with the wheel 87. These gears are represented by dotted lines in Fig. 1 and in plan view, Fig. 9. These gears 86 and 87 are of the same pitch-line as the impression-cylinders, so that the parts will receive a motion corresponding to that of the bed. By arranging the gears in this manner the impression-cylinder *a* receives its movements from the gear 88 acting on the gear 87, and the cylinder *a'* from the gear 89 acting on the gear 86, and the gears 86 and 87 do not touch, but they lap past each other sufficiently for the impression-cylinders to be contiguous to each other, and either cylinder can be lifted bodily to throw off the impression without being partially rotated by the gear-teeth in the act of being raised or lowered, whereas in presses of this kind wherein the teeth of the gears 86 87 interlock, or one cylinder is driven by the other, the elevation or depression of one cylinder in its relation to the other cylinder is liable to turn one cylinder on its axis and throw it out of register, or prevent the teeth of the segments 62 or 63 properly engaging with the rack upon the bed, especially when both impression-cylinders are raised to throw off the impressions. The pinion 175 on the outer end of the shaft 174 gears into the wheel 89, as in my aforesaid patent, No. 321,539.

I claim as my invention—

1. The combination, with the impression-cylinder in a printing-press and the journal-boxes and tie-rods, of the slides 5 at the lower ends of such tie-rods, the journals 10, resting upon the slides and secured thereto by straps, the toggle-blocks K and K', the pivot-plates 15, pins 16, and the washers 17, having annular ribs passing into similar grooves in the moving ends of the toggle-blocks, substantially as set forth.

2. The combination, with the impression-cylinder, journal-boxes, and vertical tie-rods, of the slides 5, the toggle-blocks K K', intervening between the slides 5 and the frame of the press, the arms 12, extending downwardly and terminating as segmental racks, the cross rock-shaft having at its ends segmental racks gearing into the teeth at the ends of the arms, and the latch-bar and crank for giving motion to the cross-shaft, and the reciprocating bar A and cam B, substantially as set forth.

3. The combination, with the revolving shaft B', cam B, and reciprocating bar A, of the latch-bar and mechanism connected with the same for raising and lowering the impression-cylinder, the treadle, the crank P on the shaft B', the movable crank-pin, the slide-collar and connection from the same to the treadle, and the cam upon the latch-bar acted upon by the crank-pin to raise the latch-bar, substantially as set forth.

4. The combination, with two impression-cylinders and the mechanism for raising and lowering the same, of the two cross-shafts L L', their cranks, and the two latch-bars C D, connected with such cranks, the reciprocating bar A, the shaft B', and cam B for giving motion to such reciprocating bar A, the pins upon the reciprocating bar, with which the latch-bars connect, the crank-arm P, movable crank-pin 36, cams 45 and 50, lever G, link 49, arms E and F, and the connection to the latch-bar D, whereby one crank-pin is made to throw off the impression of either cylinder or both in succession and at the proper time, substantially as set forth.

5. The combination, with the impression-cylinder, its journal-boxes, and vertical tie-rods, of the slides connecting the lower ends of the tie-rods, the springs below such slides, and adjusting-screws to regulate the power of the springs, toggle-blocks between the slides and the frame of the machine, the cylindrical ends of the said toggle-blocks being received into semicircular recesses in the slide and frame, respectively, and the pivot-plates and straps for connecting the parts, substantially as set forth.

6. The combination, with the impression-cylinder in a printing-press, and the journal-boxes and tie-rods, of the slides 5 at the lower ends of such tie-rods, toggle-blocks K and K′, having journals upon the slides and frame, respectively, the washers 17, having annular ribs passing into smaller grooves in the moving ends of the toggle-blocks, substantially as specified.

7. The combination, with the impression-cylinder, journal-boxes, and vertical tie-rods, of the slides 5, the toggle-blocks K K′, intervening between the slides and the frame of the press, the arms 12, extending downwardly and terminating as segmental racks, the cross rock-shaft having at its ends racks gearing into teeth at the ends of the arms, and mechanism for rocking the cross-shaft, substantially as set forth.

8. The combination, with the impression-cylinder, journal-boxes, and vertical tie-rods, of the slides 5, the toggle-blocks K K′, intervening between the slides 5 and the frame of the press, the arms 12, connected with the journals of the toggle-blocks, the latch-bar and the reciprocating bar A and cam B, the rock-shaft L, and connections from the latch-bar to the rock-shaft and from the rock-shaft to the arms 12, substantially as set forth.

9. The combination, with the impression-cylinders *a a′* and the reciprocating type-bed *b*, of the rack 60, attached to the type-bed, and the segmental racks 62 and 63, attached to the impression-cylinders *a a′*, respectively, the teeth of the rack on one cylinder being in a different plane from the teeth upon the rack of the other cylinder and the rack upon the type-bed being adapted to receive the teeth of both the segmental racks, substantially as set forth.

10. The combination of the type-bed, the rack upon the same, and the pinion for reciprocating such rack, the rollers 68 at the ends of the racks having an end movement upon their pivots or gudgeons, and a spring and pin for giving motion to each roller endwise of its axis, substantially as set forth.

11. The combination, with the impression-cylinder and latch-bar and the intervening connecting mechanism, of a lever and spring, and a roller on the lever acting against an incline upon the latch-bar when the impression is thrown off, for the purposes set forth.

12. The combination, with the impression-cylinders and the reciprocating bed, of the gear-wheels 86 and 87 of the same pitch-line as the impression-cylinders and upon the respective shafts thereof and set at different distances from the frame of the machine, so that the teeth do not engage each other, and the gear-wheels for driving such gears 86 and 87, and means for raising and lowering the impression-cylinders, substantially as set forth.

13. The combination, with the impression-cylinders and the reciprocating bed, of the gear-wheels 86 and 87 upon the shafts of such impression-cylinders, set at different distances from the frame of the machine, so that the teeth do not engage each other, and the gear-wheels for driving such gears 86 and 87, and means for raising and lowering the impression-cylinders, racks upon the respective impression-cylinders and upon the reciprocating bed, substantially as set forth.

14. The combination, with the reciprocating type-bed, of two contiguous impression-cylinders, one receiving the sheet from the other, and mechanism for raising and lowering such impression-cylinders, and separate gearing for rotating such impression-cylinders from the driving-shaft, the impression-cylinders not being directly geared together, substantially as set forth.

15. The reciprocating type-bed, rack, and pinion 74 for driving the same, in combination with the two impression-cylinders, separate gears of the same pitch-line as the impression-cylinders and upon the shafts thereof and in different planes, so as not to touch each other, intermediate gears 88 and 89 for driving the gears upon the impression-cylinder shafts, and a gear upon the shaft of the pinion 74, gearing into the intermediate 89, substantially as set forth.

16. The combination, in a perfecting-press, with a type-bed, and two contiguous impression-cylinders, and means for raising and lowering the same, of gearing for driving the bed, and a separate train of gearing from the driving-shaft to each impression-cylinder, the gears on the impression-cylinder shafts not touching each other, whereby the bed and cylinders are moved in unison and the impression-cylinders can be raised or lowered without being turned thereby on their axes, substantially as set forth.

Signed by me this 19th day of November, 1890.

WALTER SCOTT.

Witnesses:
GEO. T. PINCKNEY,
WILLIAM G. MOTT.